United States Patent
Gratton

(10) Patent No.: US 8,408,466 B2
(45) Date of Patent: Apr. 2, 2013

(54) ASSISTING MATRIX CODE CAPTURE BY SIGNALING MATRIX CODE READERS

(75) Inventor: Max Stephen Gratton, Lakewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 130 days.

(21) Appl. No.: 12/984,385

(22) Filed: Jan. 4, 2011

(65) Prior Publication Data

US 2012/0168510 A1 Jul. 5, 2012

(51) Int. Cl.
*G06K 7/10* (2006.01)

(52) U.S. Cl. .................................... 235/462.1

(58) Field of Classification Search ............. 235/462.01, 235/435, 454, 462.1, 472.01–472.03
See application file for complete search history.

(56) References Cited

U.S. PATENT DOCUMENTS

| | | | |
|---|---|---|---|
| 5,510,603 A | 4/1996 | Hess et al. | |
| 5,581,636 A | 12/1996 | Skinger | |
| 5,703,349 A | 12/1997 | Meyerson et al. | |
| 5,978,855 A | 11/1999 | Metz et al. | |
| 6,006,990 A | 12/1999 | Ye et al. | |
| 6,058,238 A | 5/2000 | Ng | |
| 6,556,273 B1 | 4/2003 | Wheeler et al. | |
| 7,206,409 B2 | 4/2007 | Antonellis et al. | |
| 7,328,848 B2 | 2/2008 | Xia et al. | |
| 7,394,519 B1 | 7/2008 | Mossman et al. | |
| 7,424,976 B2 | 9/2008 | Muramatsu | |
| 7,604,172 B2 | 10/2009 | Onogi | |
| 7,624,417 B2 | 11/2009 | Dua | |
| 7,624,916 B2 | 12/2009 | Sato et al. | |
| 7,673,297 B1 | 3/2010 | Arsenault et al. | |
| 7,797,430 B2 | 9/2010 | Ichieda | |
| 7,841,531 B2 | 11/2010 | Onogi | |
| 2001/0037297 A1 | 11/2001 | McNair | |
| 2002/0027612 A1 | 3/2002 | Brill et al. | |
| 2002/0049980 A1 | 4/2002 | Hoang | |
| 2002/0112250 A1 | 8/2002 | Koplar et al. | |
| 2003/0050854 A1 | 3/2003 | Showghi et al. | |

(Continued)

FOREIGN PATENT DOCUMENTS

CN 1571503 A 1/2005
CN 101 227 581 A 7/2008

(Continued)

OTHER PUBLICATIONS

International Search Report and Written Opinion of PCT/US11/59977 mailed on Mar. 19, 2012, 7 pages.

(Continued)

*Primary Examiner* — Seung Lee
(74) *Attorney, Agent, or Firm* — Kilpatrick Townsend & Stockton LLP

(57) ABSTRACT

An electronic device identifies that it will transmit a matrix code to a display. Then, the device may transmit a signal to a matrix code reader. The signal instructs the reader to perform a matrix code capture action such as playing an alert, powering an optical reader, launching a capture application, and so on. The device may evaluate one or more conditions before transmitting and the reader may evaluate one or more conditions before performing the action. The device may transmit the signal to any reader within a communication range, only to readers on a matrix code reader list, and so on. Additionally, a reader may transmit a confirmation message to the device when the reader captures a matrix code after receiving a related signal confirming that the matrix code was captured successfully.

19 Claims, 9 Drawing Sheets

U.S. PATENT DOCUMENTS

| | | |
|---|---|---|
| 2003/0121978 A1 | 7/2003 | Rubin et al. |
| 2003/0172374 A1 | 9/2003 | Vinson et al. |
| 2004/0019691 A1 | 1/2004 | Daymond et al. |
| 2004/0044532 A1 | 3/2004 | Karstens |
| 2005/0015800 A1 | 1/2005 | Holcomb |
| 2005/0125301 A1 | 6/2005 | Muni |
| 2005/0262548 A1 | 11/2005 | Shimojo et al. |
| 2005/0264694 A1 | 12/2005 | Ilan et al. |
| 2006/0079247 A1 | 4/2006 | Ritter |
| 2006/0086796 A1 | 4/2006 | Onogi |
| 2006/0124742 A1 | 6/2006 | Rines et al. |
| 2006/0196950 A1 | 9/2006 | Kiliccote |
| 2006/0265731 A1 | 11/2006 | Matsuda |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0206020 A1 | 9/2007 | Duffield et al. |
| 2007/0256118 A1 | 11/2007 | Nomura et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0077324 A1 | 3/2008 | Hatano et al. |
| 2008/0092154 A1 | 4/2008 | Hogyoku |
| 2008/0156879 A1 | 7/2008 | Melick et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0267537 A1 | 10/2008 | Thuries |
| 2008/0281624 A1 | 11/2008 | Shibata |
| 2009/0031373 A1 | 1/2009 | Hogyoku |
| 2009/0083808 A1 | 3/2009 | Morrison |
| 2009/0108057 A1 | 4/2009 | Mu et al. |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0212112 A1 | 8/2009 | Li |
| 2009/0212113 A1 | 8/2009 | Chiu et al. |
| 2009/0254954 A1 | 10/2009 | Jeong |
| 2009/0303036 A1 | 12/2009 | Sahuguet |
| 2009/0312105 A1 | 12/2009 | Koplar |
| 2010/0017457 A1 | 1/2010 | Jumpertz et al. |
| 2010/0020970 A1 | 1/2010 | Liu et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0129057 A1 | 5/2010 | Kulkarni |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0201894 A1 | 8/2010 | Nakayama et al. |
| 2010/0217663 A1 | 8/2010 | Ramer et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2011/0039573 A1 | 2/2011 | Hardie |
| 2011/0065451 A1 | 3/2011 | Danado et al. |
| 2011/0208710 A1 | 8/2011 | Lesavich |
| 2011/0264527 A1 | 10/2011 | Fitzpatrick et al. |
| 2011/0282727 A1 | 11/2011 | Phan et al. |
| 2012/0128267 A1 | 5/2012 | Dugan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0155838 A1 | 6/2012 | Gerhards et al. |
| 2012/0159563 A1 | 6/2012 | Gomez et al. |
| 2012/0169928 A1 | 7/2012 | Casagrande et al. |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |

FOREIGN PATENT DOCUMENTS

| | | |
|---|---|---|
| DE | 10 2007 038 810 A1 | 2/2009 |
| EP | 1 021 035 A1 | 7/2000 |
| EP | 1 383 071 A2 | 1/2004 |
| EP | 1 724 695 A1 | 11/2006 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 325 765 A | 12/1998 |
| GB | 2 471 567 A | 1/2011 |
| JP | 2008 244556 A | 10/2008 |
| KR | 2004 0087776 A | 10/2004 |
| WO | 95/27275 A1 | 10/1995 |
| WO | 97/41690 A1 | 11/1997 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/057651 | 5/2009 |
| WO | 2009/144536 A1 | 12/2009 |
| WO | 2011/009055 A2 | 1/2011 |

OTHER PUBLICATIONS

International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.
International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.

U.S. Appl. No. 12/971,349, filed Dec. 17, 2010, Office Action mailed Nov. 10, 2011, 9 pages.

U.S. Appl. No. 12/971,349, filed Dec. 17, 2010, Final Office Action mailed Jan. 20, 2012, 10 pages.

U.S. Appl. No. 12/986,721, filed Jan. 7, 2011, Office Action mailed Mar. 16, 2012, 6 pages.

"Android App Reviews & Showcase Just a Tapp Away," Android Tapp, 10 pp. Found online at http://www.androidtapp.com/download-the-weather-channel-android-app-from-your-tv/, Oct. 22, 2010.

"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.

"FOX TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local—QR Barcode Technology, 2 pp. Found online at http://www.searchmagnetlocal.com/qr_barcode_technology.html, Oct. 22, 2010.

Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.

Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.

Smith, Lindsay, "Barcodes Make History on Global TV", 3 pp. Found online at http://www.lindsaysmith.com/worlds-first-mobio-mini-telethon/, Oct. 22, 2010.

Nghee, Seah Y. , "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.

Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.

Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.

Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.

Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.

Byford, D., "Universal Interactive Device," International Business Machines Corporation, Jun. 1998, 1 page.

International Search Report and Written Opinion of PCT/US11/60094 mailed on Mar. 30, 2012, 7 pages.

International Search Report of PCT/US11/60109 mailed on Feb. 14, 2012, 3 pages.

International Search Report and Written Opinion of PCT/US2011/068161 mailed on Jun. 14, 2012, 19 pages.

International Search Report and Written Opinion of PCT/US2012/021657 mailed on May 23, 2012, 12 pages.

International Search Report and Written Opinion of PCT/US2012/022405 mailed on Apr. 19, 2012, 11 pages.

International Search Report and Written Opinion of PCT/US2012/024923 mailed on May 22, 2012, 12 pages.

International Search Report and Written Opinion of PCT/US2012/024956 mailed on Jun. 11, 2012, 10 pages.

International Search Report and Written Opinion of PCT/US2012/025502 mailed Jun. 8, 2012, 13 pages.

International Search Report and Written Opinion of PCT/US2012/025607 mailed Jun. 8, 2012, 13 pages.

International Search Report and Written Opinion of PCT/US2012/025634 mailed on May 7, 2012, 8 pages.

International Search Report and Written Opinion of PCT/US2012/026373 mailed Jun. 13, 2012, 14 pages.

International Search Report and Written Opinion of PCT/US2012/026722 mailed Jun. 28, 2012, 11 pages.

Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.

Yang, C., et al., "Embedded Digital Information Integrated by Video-on-Demand System," Proceedings of the Fourth International Conference on Networked Computing and Advanced Information Management, IEEE Computer Society, 2008, 6 pages.

U.S. Appl. No. 12/971,349, filed Dec. 17, 2010, Office Action mailed Jul. 16, 2012, 11 pages.

U.S. Appl. No. 12/986,721, filed Jan. 7, 2011, Notice of Allowance mailed Jun. 21, 2012, 7 pages.

U.S. Appl. No. 13/020,678, filed Feb. 3, 2011, Office Action mailed Jul. 30, 2012, 15 pages.

U.S. Appl. No. 13/035,525, filed Feb. 25, 2011, Office Action mailed Jul. 18, 2012, 15 pages.

ASSISTING MATRIX CODE CAPTURE BY SIGNALING MATRIX CODE READERS

FIELD OF THE INVENTION

This disclosure relates generally to matrix codes, and more specifically to assisting capture of matrix codes by signaling matrix code readers when the matrix codes will be displayed.

SUMMARY

The present disclosure discloses systems and methods for assisting matrix code capture by signaling matrix code readers. An electronic device (such as a set top box, a television, an electronic kitchen appliance, and so on) may identify that it will transmit a matrix code to a display device. Based on the identified matrix code, the electronic device may determine transmit a signal to one or more matrix code readers (such as smart phones, mobile computing devices, and so on). Upon receipt, the signal may instruct the one or more matrix code readers to perform one or more actions associated with capturing the matrix code. Such actions may include, but are not limited to, playing an alert, powering up an optical reader device, launching a matrix code capture application, and so on. As a result of the assistance provided by the electronic device, a user of the matrix code reader may be more prepared to capture a displayed matrix code and may thus have an increased chance of being able to take advantage of functionality associated with the displayed matrix code.

In some implementations, the electronic device may transmit the signal a certain period of time prior to transmitting the matrix code to the display device, such as ten seconds, one minute, and so on. However, in other implementations the electronic device may transmit the signal at approximately the same time that the matrix code is transmitted or even after the matrix code is transmitted. The electronic device may transmit the signal utilizing a variety of different wired and/or wireless communication links, such as a Bluetooth® communication link, a WiFi communication link, and so on. In various implementations, the electronic device may transmit the signal to any matrix code reader within a communication range of the communication link utilized for the transmission. However, in other implementations, the electronic device may transmit the signal only to a set of one or more matrix code readers that have previously been paired with the electronic device.

In one or more implementations, the electronic device may identify that the matrix code will be transmitted based on the fact that the electronic device will generate the matrix code and thus is aware that the matrix code will be transmitted. In various other implementations, the electronic device may identify that the matrix code will be transmitted based on image analysis of content that the electronic device is transmitting to a display device. In still other implementations, the electronic device may identify that the matrix code will be transmitted based on metadata included with content that the electronic device is transmitting to a display device.

In various implementations, the electronic device may evaluate one or more conditions of one or more filter lists as part of determining whether or not to signal one or more matrix code readers based on the impending transmittal of the matrix code. The filter condition lists may include conditions under which signals shall and/or shall not be transmitted if a matrix code is identified. Such conditions may include one or more of time periods, characteristics of the matrix code, characteristics of the matrix code reader, characteristics of content that the electronic device is configured to transmit to a display device, characteristics of metadata included with the content that the electronic device is configured to transmit to a display device, and so on. Further, in various implementations, a matrix code reader that has received a signal from the electronic device regarding an impending transmittal of a matrix code may evaluate one or more conditions of one or more filter lists to determine whether or not to perform the instructed action(s).

Additionally, in some implementations, a matrix code reader may transmit a confirmation message to the electronic device when the matrix code reader captures a matrix code after receiving a related signal. The confirmation message may confirm that the matrix code was captured successfully.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
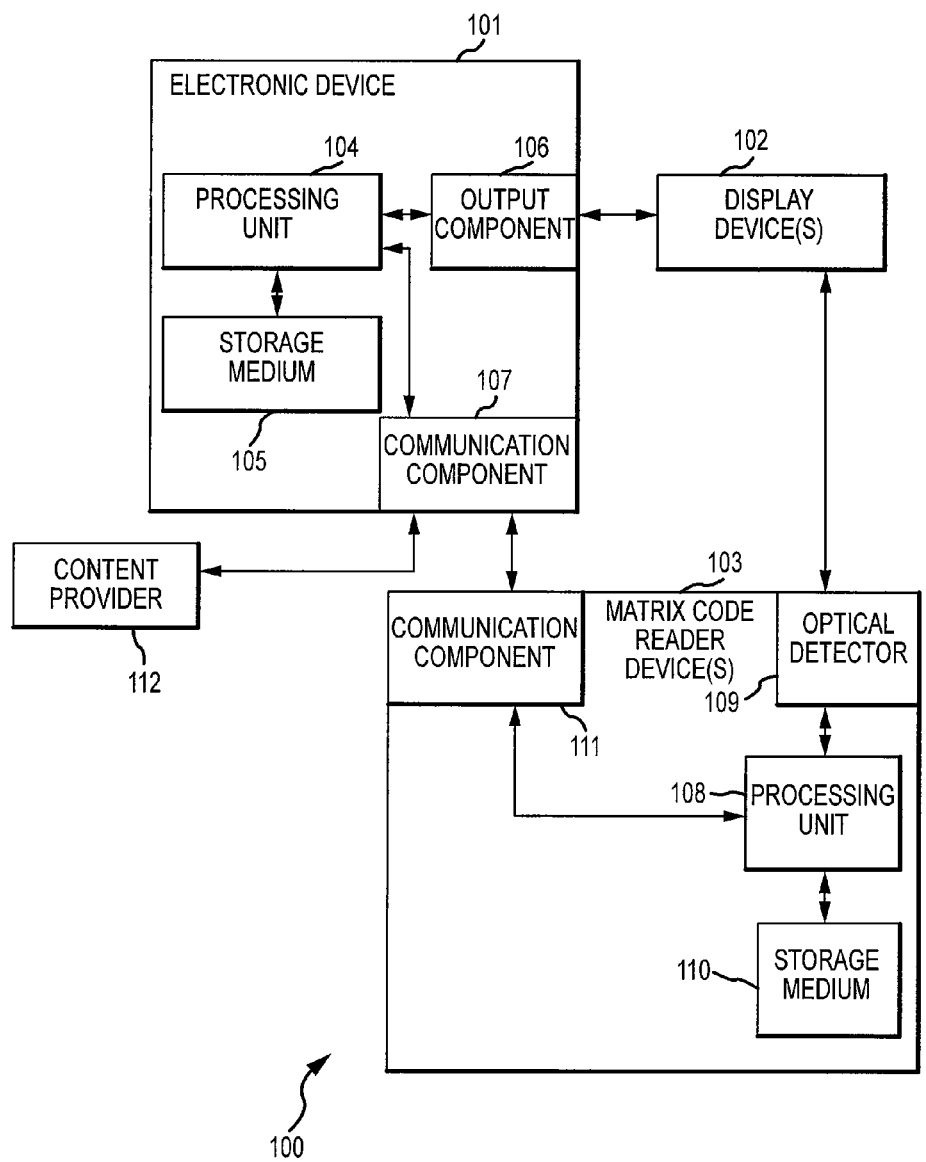
FIG. 1 is a block diagram illustrating a system for assisting matrix code capture by signaling matrix code readers.

The description that follows includes sample systems, methods, and computer program products that embody various elements of the present disclosure. However, it should be understood that the described disclosure may be practiced in a variety of forms in addition to those described herein.

Electronic devices (such as set top boxes, television receivers, digital video recorders, digital video disc players, televisions, desktop computers, electronic kitchen appliances, and so on) may display matrix codes, such as QR codes, for a variety of purposes. These purposes may include, but are not limited to, connecting users to information, providing content that is related to an aspect of the electronic device, facilitating ordering of products or services, assisting users in operating the electronic device, and so on. To make use of matrix codes displayed by an electronic device, a user may capture the matrix code utilizing a matrix code reader device. For example, a user may take a picture of the matrix code using a camera on a cellular telephone. The cellular telephone may include an application that decodes information from the captured matrix code and performs one or more actions based on that information (such as displaying the decoded information, connecting to a web site, transmitting the decoded information to another device, and so on), an application that transmits the captured matrix code to another device for decoding and performing actions, and so on.

However, the role of such an electronic device in capture of a displayed matrix code is essentially passive. The electronic device may merely display the matrix code for a period of time, perhaps with a time warning displayed beforehand that a matrix code is about to be displayed. If a user does not have time after realizing that the matrix code is being displayed (or is about to be displayed) to locate their matrix code reader and utilize it to capture the matrix code, the user misses out on the functionality to which the matrix code relates. The burden is on the user to capture before the electronic device ceases displaying the matrix code, not on the electronic device. Even if the user requires assistance in locating their matrix code reader, preparing it to capture the matrix code, and utilizing it to actually capture the matrix code, the electronic device is incapable of providing such assistance.

The present disclosure discloses systems and methods for assisting matrix code capture by signaling matrix code readers. An electronic device may identify that it will transmit a matrix code to a display device. The electronic device may identify the matrix code based on the fact that the electronic device will generate the matrix code, based on image analysis of content that the electronic device is transmitting to a display, based on metadata included with the content, and so on. Based on the identified matrix code to be transmitted, the electronic device may determine transmit a signal to one or more matrix code reader devices (which may be based on evaluating one or more conditions of one or more filter lists).

The electronic device may transmit the signal a certain period of time prior to transmitting the matrix code to the display device, such as ten seconds, one minute, and so on. The electronic device may transmit the signal utilizing a variety of different wired and/or wireless communication links (such as a Bluetooth® communication link, a WiFi communication link, and so on). The electronic device may transmit the signal to any matrix code reader within a communication range of the communication link utilized for the transmission, only to a set of one or more matrix code readers that have previously been paired with the electronic device, and so on.

Upon receipt, the signal may instruct the one or more matrix code readers to perform one or more actions associated with capturing the matrix code such as playing an alert, powering up an optical reader device, launching a matrix code capture application, and so on. The instructed matrix code reader may evaluate one or more conditions of one or more filter lists to determine whether or not to perform the instructed action(s). In some implementations, when one of the matrix code readers captures the matrix code, the respective matrix code reader may transmit a confirmation message to the electronic device, confirming that the matrix code was captured successfully.

FIG. 1 is a block diagram illustrating a system 100 for assisting matrix code capture by signaling matrix code readers. The system 100 includes a electronic device 101, one or more display devices 102, and one or more matrix code reader devices 103. The electronic device may be any electronic device such as a set top box, a television receiver, a digital video recorder, a digital video disc player, a television, a desktop computer, an electronic kitchen appliance, and so on. The display device may be any kind of display device such as a cathode ray tube display, a liquid crystal display, a plasma display, a computer monitor, and so on. The matrix code reader device may be any kind of matrix code reader device such as a cellular telephone or mobile computing device that includes a camera, a barcode reader, and so on.

The electronic device 101 may include one or more processing units 104, one or more non-transitory storage media 105 (which may take the form of, but is not limited to, a magnetic storage medium; optical storage medium; magneto-optical storage medium; read only memory; random access memory; erasable programmable memory; flash memory; and so on), one or more output components 106, and one or more communication components 107. The processing unit may execute instructions stored in the non-transitory storage medium to transmit data to the display device 102 via the output component. For example, the electronic device may be a set top box, the display device may be a television, and the set top box may receive content (such as television programming, video on demand, and so on) from a content provider (such as a cable television provider, a satellite television provider, a video on demand provider, and so on) via the communication component 107 and transmit the received content to the television via the output component 106. The data that the processing unit may transmit to the display device via the output component may include one or more matrix codes (such as one or more QR codes). This matrix code may be transmitted to the display device for purposes including, but not limited to, connecting users to information, providing content that is related to an aspect of the electronic device, facilitating ordering of products or services, assisting users in operating the electronic device, and so on.

The matrix code reader 103 may include one or more processing units 108, one or more optical detectors 109 (such as a still image camera, a video camera, a barcode reader, and so on), one or more non-transitory storage media 110 (which may take the form of, but is not limited to, a magnetic storage medium; optical storage medium; magneto-optical storage medium; read only memory; random access memory; erasable programmable memory; flash memory; and so on), and one or more communication components 111. The processing unit 108 may execute instructions stored in the non-transitory storage medium 110 to capture one or more matrix codes displayed on the display device 102. The processing unit may also execute instructions stored in the non-transitory storage medium to decode information from the captured matrix code and perform one or more actions based on that information (such as displaying the decoded information, connecting to a web site, transmitting the decoded information to another device, and so on), transmit the captured matrix code to another device for decoding and performing actions, and so on.

To assist a user to capture matrix codes displayed by the display device 102, the electronic device 101 may identify that the electronic device will transmit a matrix code to the display device, determine to signal one or more matrix code reader devices 103 based on the identification, and transmit one or more signals to the one or more matrix code reader devices (via the communication components 107 and 111) that instruct the one or more matrix code reader devices to perform one or more actions related to capture of the matrix code. The one or more actions may include such operations as providing an alert regarding capture of the matrix code (such as a buzzer, a bell, a light, a vibration, and so on), powering on and/or otherwise readying the optical detector 109 to capture the matrix code, launching a matrix code software application, and so on. Hence, a user utilizing a signaled matrix code reader device may be more prepared to capture the matrix code, increasing the user's ability to access functionality related to the matrix code.

The electronic device 101 may identify that the electronic device will transmit a matrix code to the display device 102 and transmit a related signal to a matrix code reader device 103 a period of time (such as twenty seconds, one minute, and so on) before the electronic device 101 transmits the matrix code to the display device. As the signal may be transmitted prior to the display of the matrix code by the display device, a user utilizing the matrix code reader device to capture the matrix code may have more time to capture the matrix code. However, in various implementations the electronic device may transmit the related signal to the matrix code reader device at the same time (or substantially contemporaneously, such as five milliseconds after the matrix code has been transmitted but within the period of time that the matrix code will be displayed by the display device) that the electronic device transmits the matrix code to the display device, after the electronic device transmits the matrix code to the display device, and so on.

The matrix code that will be transmitted from the electronic device 101 to the display device 102 may be identified by the electronic device in a variety of different ways. In some implementations, the electronic device may generate the matrix code that the electronic device will then transmit to the display device. In such implementations, the electronic device is aware that the electronic device will transmit the matrix code because the electronic device generated the matrix code and is able to identify that the matrix code will be transmitted without further processing. In other implementations, the matrix code may be included in content that the electronic device transmits to the display device (such as content received from the content provider 112) and the electronic device may identify that the matrix code will be transmitted by processing the content to identify matrix codes contained therein. In still other implementations, the matrix code may be included in content that the electronic device transmits to the display device and described in metadata included with the content and the electronic device may identify that the matrix code will be transmitted by analyzing the metadata. In such implementations, the metadata may indicate that the matrix code will be transmitted after an time interval and thus the electronic device may be able to transmit the signal to the matrix code reader device 103 a period of time before transmission of the matrix code based on the indicated time interval. For example, the metadata may indicate that in five minutes a matrix code will be transmitted and based on this information the electronic device may transmit the signal to the matrix code reader one minute prior to the transmission of the matrix code (or four minutes after receipt of the metadata).

The communication link that the electronic device 101 utilizes to transmit signals to the one or more matrix code reader devices via the communication components 107 and 111 may be one or more of a variety of different wired and/or wireless communication links. In various implementations, the communications link may be a Bluetooth® communication link, a WiFi communication link, a radio communication link, an infra-red communication link, a cellular communication link, a telephone communication link, a wireless local area network communication link, and so on.

In some implementations, the electronic device 101 may transmit a signal to a single matrix code reader device 103 based on identifying a matrix code that will be transmitted to the display device 102. However, in other implementations the electronic device may transmit the signal to a plurality of different matrix code reader devices. For example, after the electronic device identifies that a matrix code will be transmitted, the electronic device may transmit the signal to all matrix code reader devices that are within a communication range of the communication link to use the signal (such as within the maximum Bluetooth® range if a Bluetooth® communication link is utilized to send the signal). By way of another example, the electronic device may transmit the signal to a number of matrix code reader devices that are included on a matrix code reader list stored in the non-transitory storage medium 105. Such a matrix code reader list may be created and updated by pairing matrix code reader devices with the electronic device, adding matrix code reader devices to and/or removing matrix code reader devices from the matrix code reader list as are identified by user input, receiving matrix code reader devices from another device to add to and/or remove from the matrix code reader list, and so on.

Additionally, after identifying that a matrix code will be transmitted, the electronic device 101 may evaluate one or more conditions contained in one or more filter condition lists stored in the non-transitory storage medium 105 before transmitting a signal to one or more matrix code reader devices 103. If no conditions on the filter condition lists are met, the electronic device may determine to transmit the signal. However, if a condition on the filter list is met, the electronic device may determine not to transmit the signal. The filter condition lists may include conditions under which signals should not be transmitted even if a matrix code is identified. Such conditions may include one or more (including combinations thereof) of time periods, characteristics of the matrix code, characteristics of the matrix code reader device, characteristics of content that the electronic device is configured to transmit to the display device 102, characteristics of metadata included with the content that the electronic device is configured to transmit to the display device, and so on.

By way of a first example, the filter condition list may specify not to transmit any signals related to identified matrix codes between the hours of six and seven in the evening because a user has specified in user preferences that they do not want to be interrupted to capture matrix codes during that time period. The user may not wish to be interrupted during that time period as the time period may correspond to an airtime of their favorite television program. As such, if the electronic device 101 identifies that a matrix code will be transmitted between six and seven in the evening, the electronic device may analyze the filter condition list, evaluate that a condition has been met, and therefore not transmit the signal.

By way of a second example, the filter condition list may specify not to transmit any signals related to identified matrix codes that access information with a content rating above a parental control setting stored in the non-transitory storage medium 105. As such, if the electronic device 101 identifies that a matrix code will be transmitted that accesses mature content and the parental control setting is set to block mature content, the electronic device may analyze the filter condition list, evaluate that a condition has been met, and therefore not transmit the signal.

By way of a third example, the filter condition list may specify not to transmit any signals on weekdays to a specific matrix code reader device 103 listed in the matrix code reader list discussed above. In this example, the matrix code reader list includes the specific matrix code reader device and a second matrix code reader device. As such, if the electronic device 101 identifies that a matrix code will be transmitted on a weekday, the electronic device may analyze the filter condition list, evaluate that a condition has been met, and therefore transmit the signal to the second matrix code reader device but not to the specific matrix code reader device.

By way of a fourth example, the filter condition list may specify not to transmit any signals related to automobile advertisements during presentation of football games. As such, if the electronic device 101 identifies that a matrix code related to an automobile advertisement will be transmitted during a football game, the electronic device may analyze the filter condition list, evaluate that a condition has been met, and therefore not transmit the signal. The electronic device may identify that the matrix code relates to an automobile advertisement by analyzing the matrix code, metadata included in content that the electronic device is configured to transmit to the display device 102, and so on. The electronic device may identify that the matrix code will be transmitted during a football game by analyzing content that the electronic device is configured to transmit to the display device, metadata included with the content, and so on.

Further, in some implementations, after a matrix code reader device 103 has received a signal related to a matrix code that will be transmitted, the matrix code reader device may evaluate one or more conditions contained in one or more filter condition lists stored in the non-transitory storage medium 110 before performing an action specified by the signal. If no conditions on the filter condition lists are met, the matrix code reader device may determine to perform the specified action. However, if a condition on the filter list is met, the electronic device may not perform the specified action. The filter condition lists may include conditions under which specified action should not be performed even if signals are received. Such conditions may include one or more (including combinations thereof) of time periods, characteristics of the matrix code, characteristics of the matrix code reader device, characteristics of the electronic device, characteristics of content that the electronic device is configured to transmit to the display device 102, characteristics of metadata included with the content that the electronic device is configured to transmit to the display device, and so on. For example, the filter condition list may include a condition stating not to perform actions related to any signals unless those signals are transmitted by a particular electronic device. When the matrix code reader device receives a signal that is not transmitted by the particular electronic device, the matrix code reader device does not perform actions specified by the signal. However, when the matrix code reader device receives a signal that is transmitted by the particular electronic device, the matrix code reader device does perform actions specified by the signal.

It should be understood that operation of the filter lists described above is for the purposes of example and are not intended to be limiting. For example, within the scope of the present disclosure, condition lists could be utilized that require one or more conditions to be satisfied before signals related to matrix code transmission are transmitted and/or actions specified by such signals are performed instead of conditions to be eliminated before such occurs. As such, the above described exclusionary-type lists are illustrative of one possible arrangement and other configurations are contemplated.

In some implementations, after the matrix code reader device 103 has captured the matrix code related to the signal transmitted by the electronic device 101, the matrix code reader device may transmit a confirmation signal to the electronic device via the communication components 107 and 111. The matrix code reader device may transmit the confirmation signal to the electronic device utilizing the same communication link that the electronic device utilized to transmit the signal related to the matrix code, a different communication link than the electronic device utilized to transmit the signal related to the matrix code, and so on.

Figure 2:
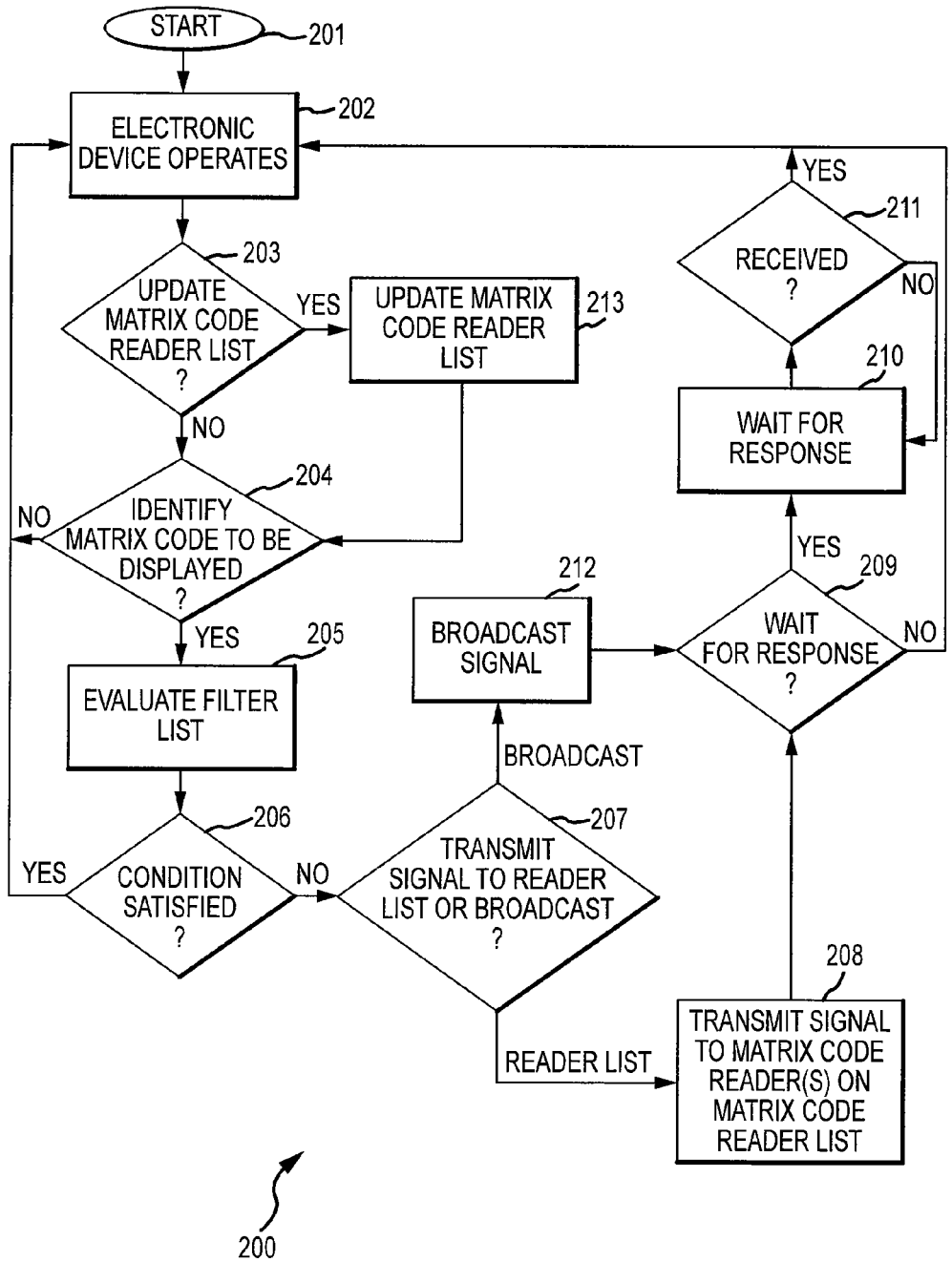
FIG. 2 is a flow chart illustrating a method for assisting matrix code capture by signaling matrix code readers. This method may be performed by the system of FIG. 1.

FIG. 2 illustrates a method 200 for assisting matrix code capture by signaling matrix code readers. The method 200 may be performed by the electronic device 101 of FIG. 1. The flow begins at block 201 and proceeds to block 202 where the electronic device 101 operates. The flow then proceeds to block 203 where the processing unit 104 determines whether or not to update the matrix code reader list stored in the non-transitory storage medium 105. If so, the flow proceeds to block 213. Otherwise, the flow proceeds to block 204.

At block 204, after the processing unit 104 determines not to update the matrix code reader list stored in the non-transitory storage medium 105, the processing unit determines whether or not there is a matrix code that the electronic device 101 will transmit to the display device 102 to be displayed by the display device. If not, the flow returns to block 202 where the electronic device continues to operate. Otherwise, the flow proceeds to block 205.

At block 205, after the processing unit 104 determines there is a matrix code that the electronic device 101 will transmit to the display device 102, the processing unit evaluates a filter list stored in the non-transitory storage medium 105. The flow then proceeds to block 206 where the processing unit determines whether or not a condition in the filter list is satisfied. If so, the flow returns to block 202 where the electronic device continues to operate. Otherwise, the flow proceeds to block 207.

At block 207, after the processing unit 104 determines that no condition in the filter list is satisfied, the processing unit determines whether to broadcast (or transmit in a multi-cast fashion) a signal related to the matrix code to all matrix code reader devices 103 within range of the communication link utilized by the communication component 107 or to transmit the signal only to matrix code readers on a matrix code reader list stored in the non-transitory storage medium 105. If the processing unit determines to broadcast the signal, the flow proceeds to block 212. Otherwise, the flow proceeds to block 208.

At block 208, after the processing unit 104 determines to transmit the signal related to the matrix code only to matrix code readers 103 on a matrix code reader list, the processing unit transmits the signal to the matrix code readers on the matrix code reader list utilizing the communication component 107. The flow then proceeds to block 209. Separate from the flow between blocks 207, 208, and 209; the electronic device 101 transmits the matrix code to the display device via the output component 106. The matrix code may be transmitted prior to block 208, contemporaneously with block 208, or after block 208.

At block 209, after the processing unit 104 transmits the signal, the processing unit determines whether or not to wait for a response from the matrix code reader(s) 103 to which the signal was transmitted. If not, the flow returns to block 202 where the electronic device continues to operate. Otherwise, the flow proceeds to block 210.

At block 210, after the processing unit 104 determines to wait for a response from the matrix code reader(s) 103 to which the signal was transmitted, the processing unit waits for the response. The flow then proceeds to block 211. At block 211, the processing unit determines whether or not the response was received via the communication component 107. If so, the flow returns to block 202 where the electronic device continues to operate. Otherwise, the flow returns to block 210 where the processing unit continues to wait for the response. It is understood that although the method 200 is illustrated and described such that the electronic device 101 waits for responses to transmitted signals prior to sending out signals related to other matrix codes that will be displayed, other configurations are possible and contemplated. For example, the processing unit may execute a listening process that waits for the response at the same time that another process executed by the processing unit identifies other matrix codes that will be transmitted and signals one or more matrix code readers 103 regarding those matrix codes.

At block 212, after the processing unit 104 determines to broadcast (or transmit in a multi-cast fashion) the signal to all matrix code reader devices 103 within range of the communication link, the processing unit broadcasts the signal to the matrix code readers within range of the communication link utilizing the communication component 107. The flow then proceeds to block 209. Separate from the flow between blocks 207, 212, and 209; the electronic device 101 transmits the matrix code to the display device via the output component 106. The matrix code may be transmitted prior to block 212, contemporaneously with block 212, or after block 212.

At block 213, after the processing unit 104 determines to update the matrix code reader list, the processing unit updates the matrix code reader list. Updating the matrix code reader list may include pairing one or more matrix code reader devices 103 with the electronic device 101, un-pairing one or more matrix code reader devices that were previously paired with the electronic device, adding one or more matrix code reader devices to the matrix code reader list based on received information regarding the one or more matrix code reader devices, removing one or more matrix code reader devices from the matrix code reader list based on received information regarding the one or more matrix code reader devices, and so on. Then, the flow proceeds to block 204 where the processing unit determines whether or not there is a matrix code that the electronic device 101 will transmit to the display device 102 to be displayed by the display device.

Figure 3A:
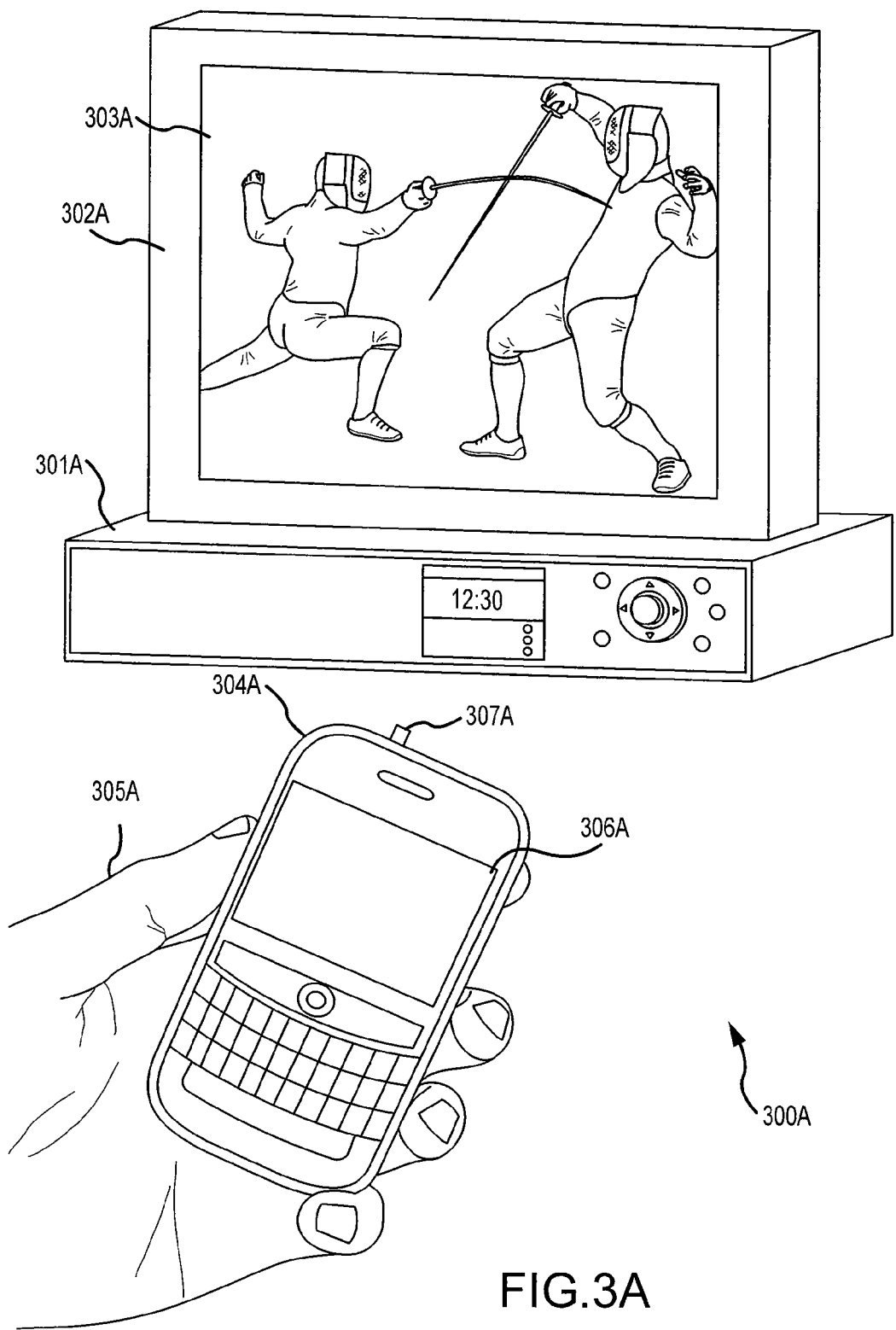
FIGS. 3A-3G are diagrams illustrating a sample system assisting a user to capture a matrix code displayed on a television. The system may be the system of FIG. 1.

FIGS. 3A-3E are illustrate a sample system 300A-300G assisting a user 305A-305G to capture a matrix code displayed on a television 302A-302G. The system may be the system of FIG. 1. As illustrated in FIG. 3A, a user 305A is viewing television programming that a set top box 301A is providing to a television 302A to display on a television screen 303A. Also as illustrated, the user possesses a smart phone 304A which he may utilize to capture one or more matrix codes displayed on the television screen.

Figure 3B:
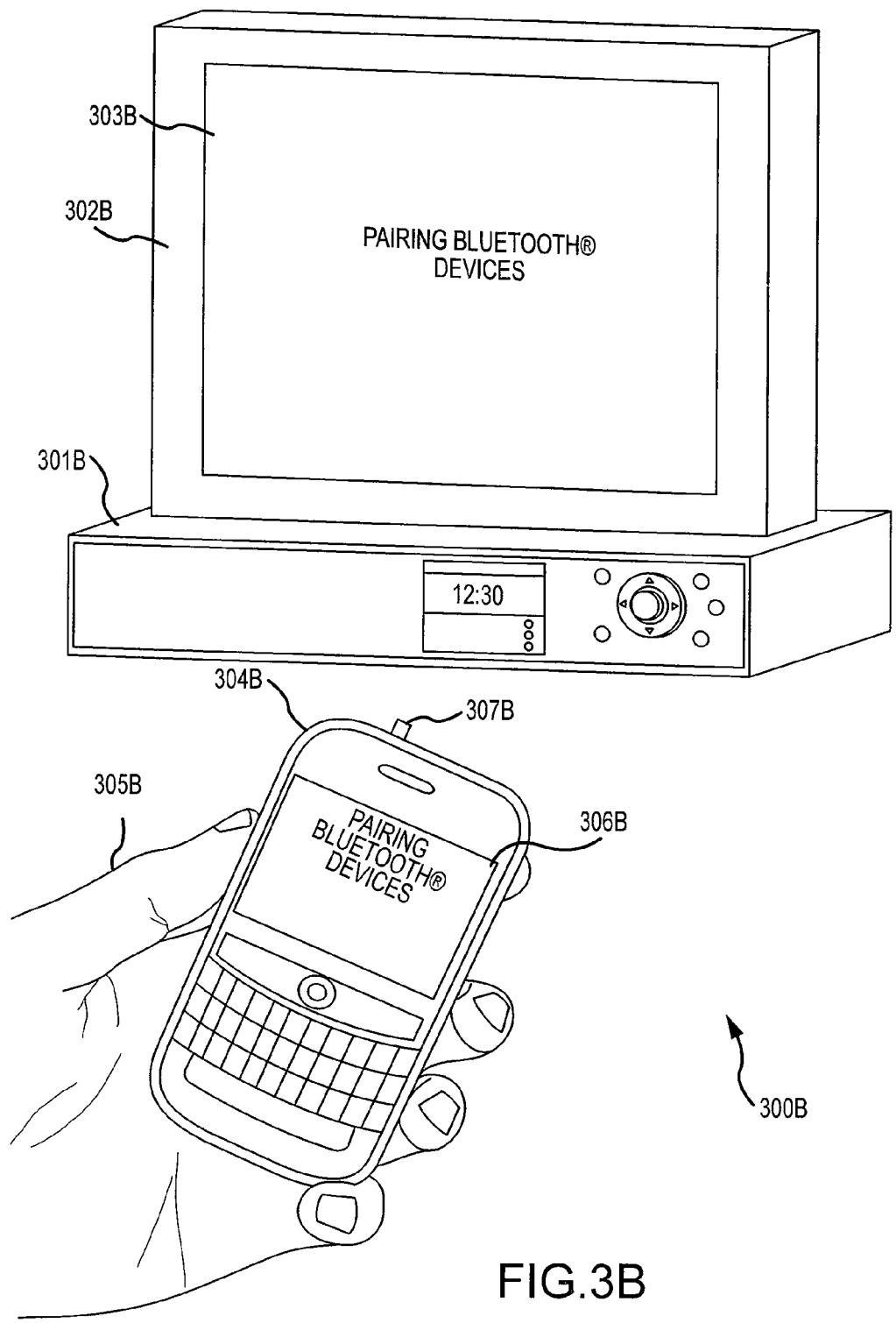

In the sample system 300A illustrated in FIG. 3A, the smart phone 304A has not previously been paired with the set top box 301A. However, the user 305A may utilize selection elements related to either the set top box or the smart phone in order to initiate a process to pair Bluetooth® communication components of the smart phone and the set top box (as shown in FIG. 3B). As part of the pairing, the set top box 301B adds the smart phone 304B to a list of matrix code reader devices.

Subsequently, the set top box 301B identifies that the set top box will transmit a matrix code to the television 302B in two minutes based on analysis of metadata included with the television programming that describes the matrix code. Based on the identification, the set top box determines to signal all devices on the list of matrix code devices (which includes the smart phone 304B) regarding the matrix code one minute prior to the time when the matrix code will be transmitted.

Figure 3C:
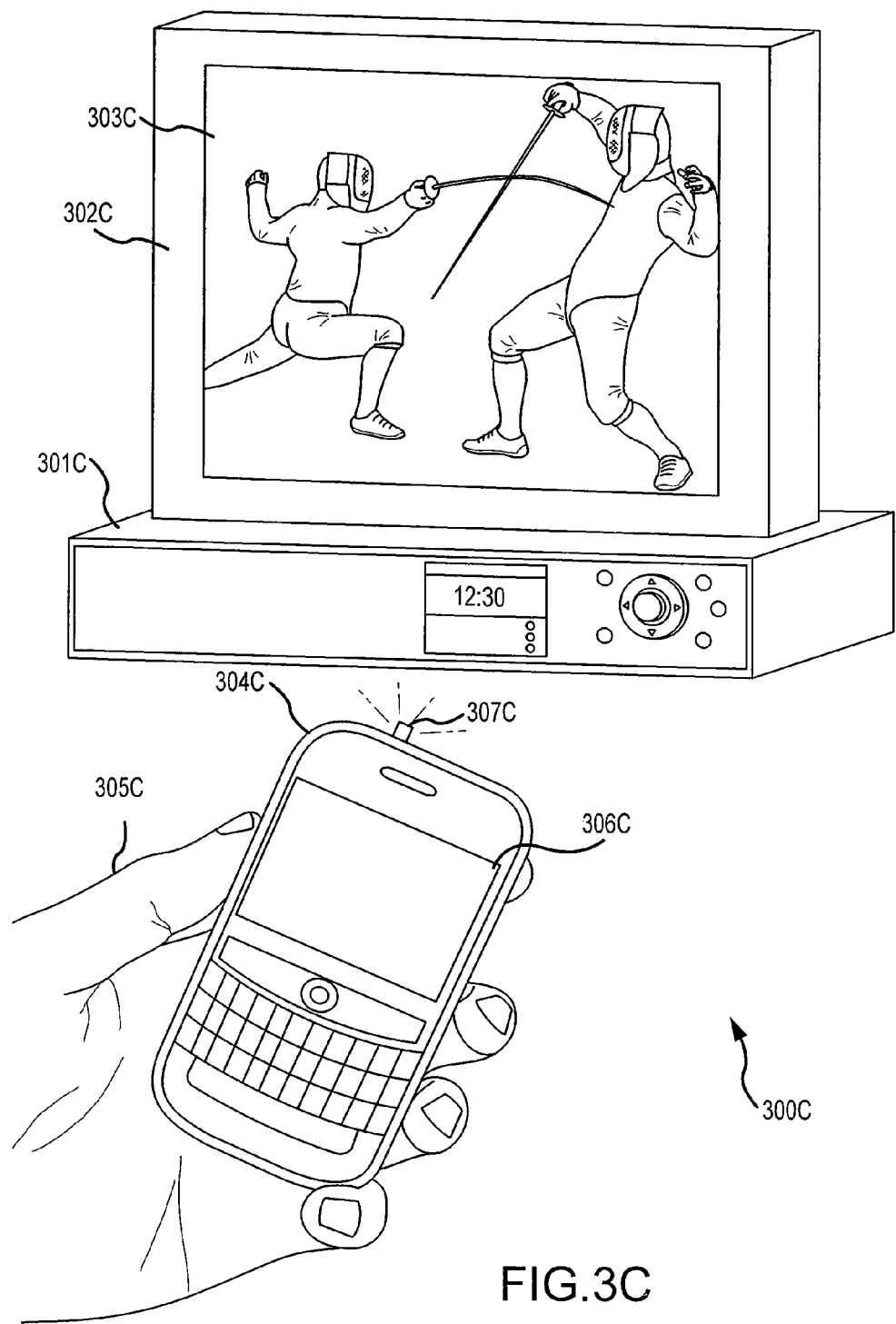
Figure 3D:
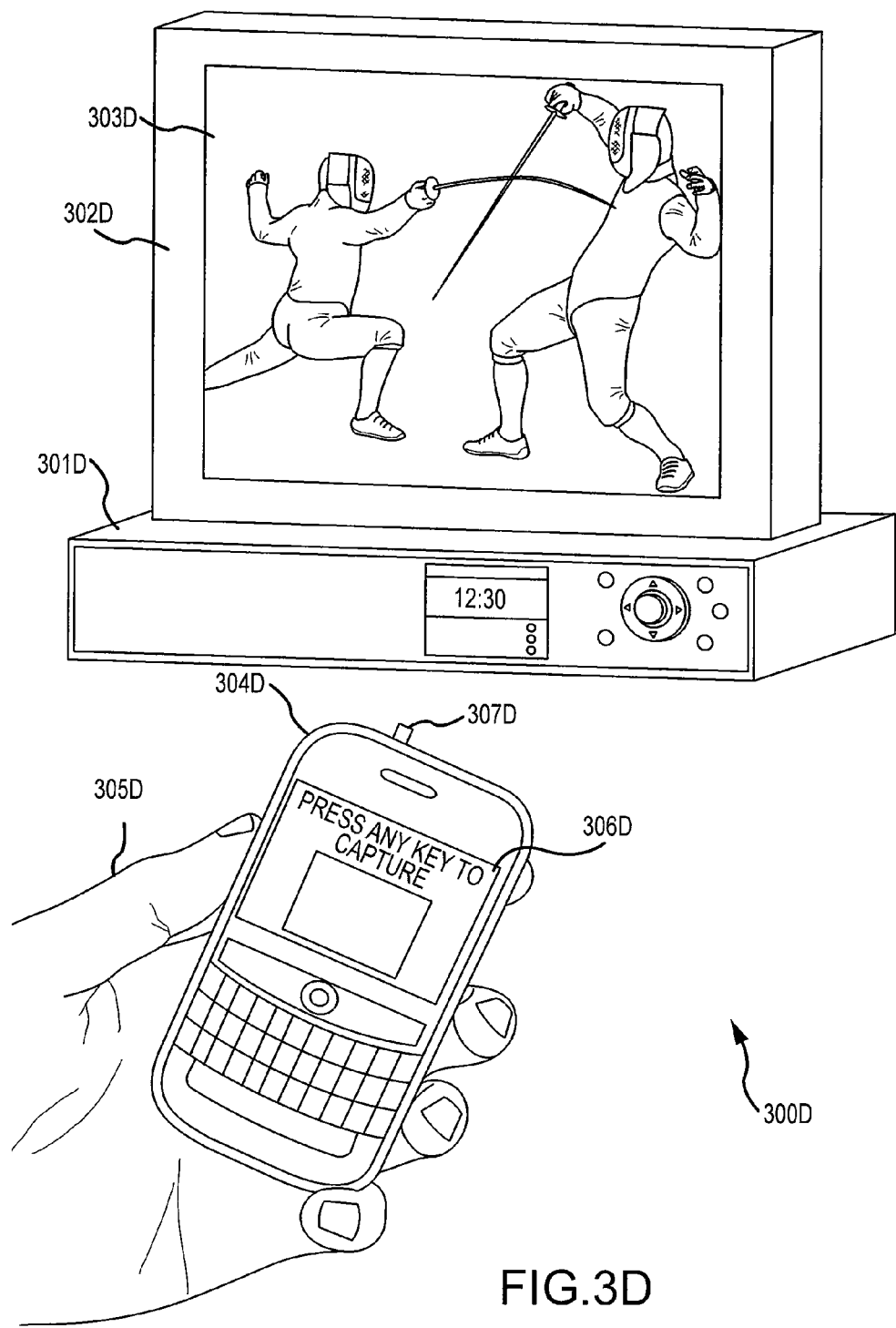

As illustrated in FIG. 3C, the signal instructs the smart phone 304C to light an indicator light 307C to alert the user that a matrix code will be displayed. Additionally, as illustrated in FIG. 3D, the signal also instructs the smart phone 304D to then launch a matrix code capture application (displayed on a smart phone screen 306D).

Figure 3E:
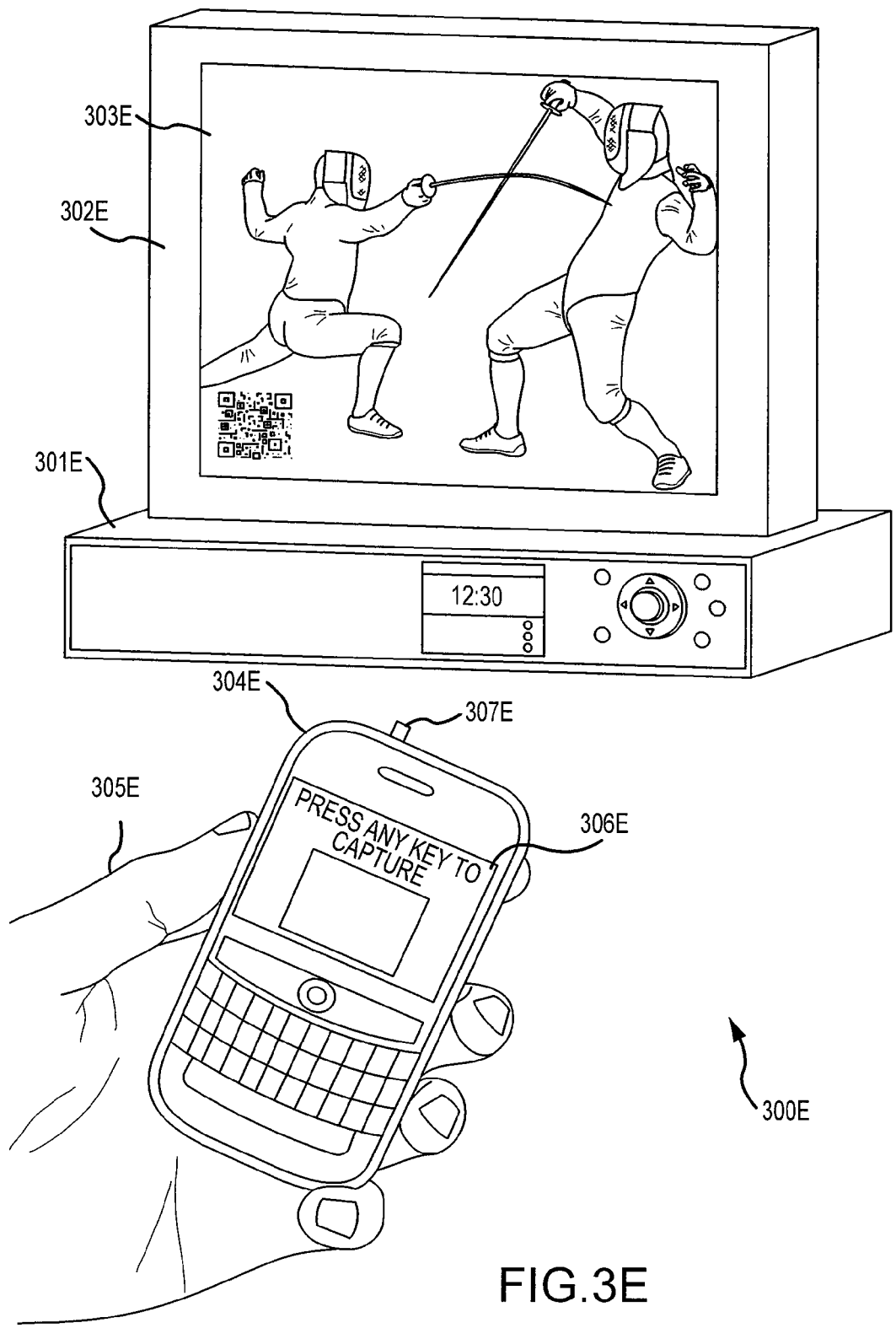
Figure 3F:
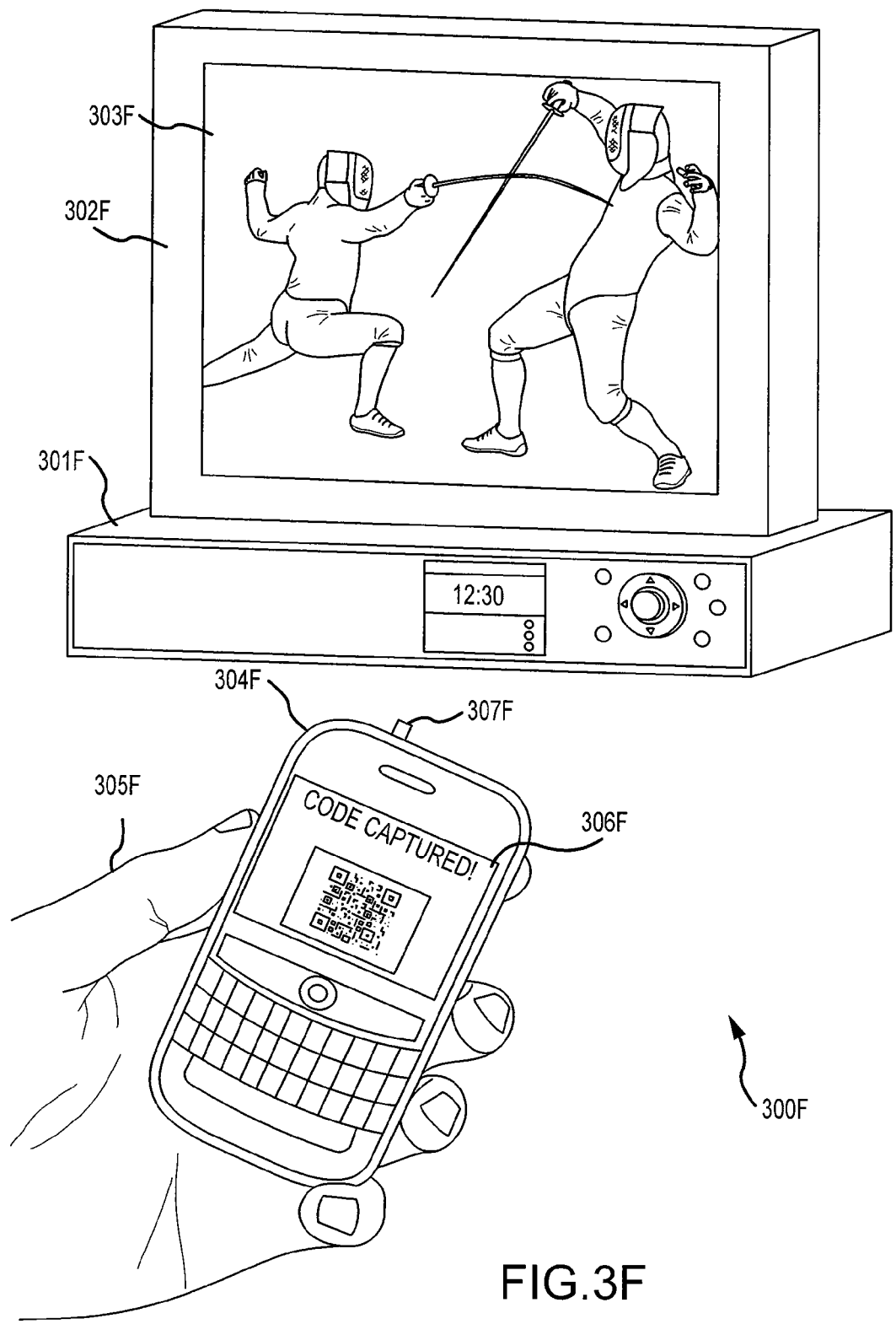
Figure 3G:
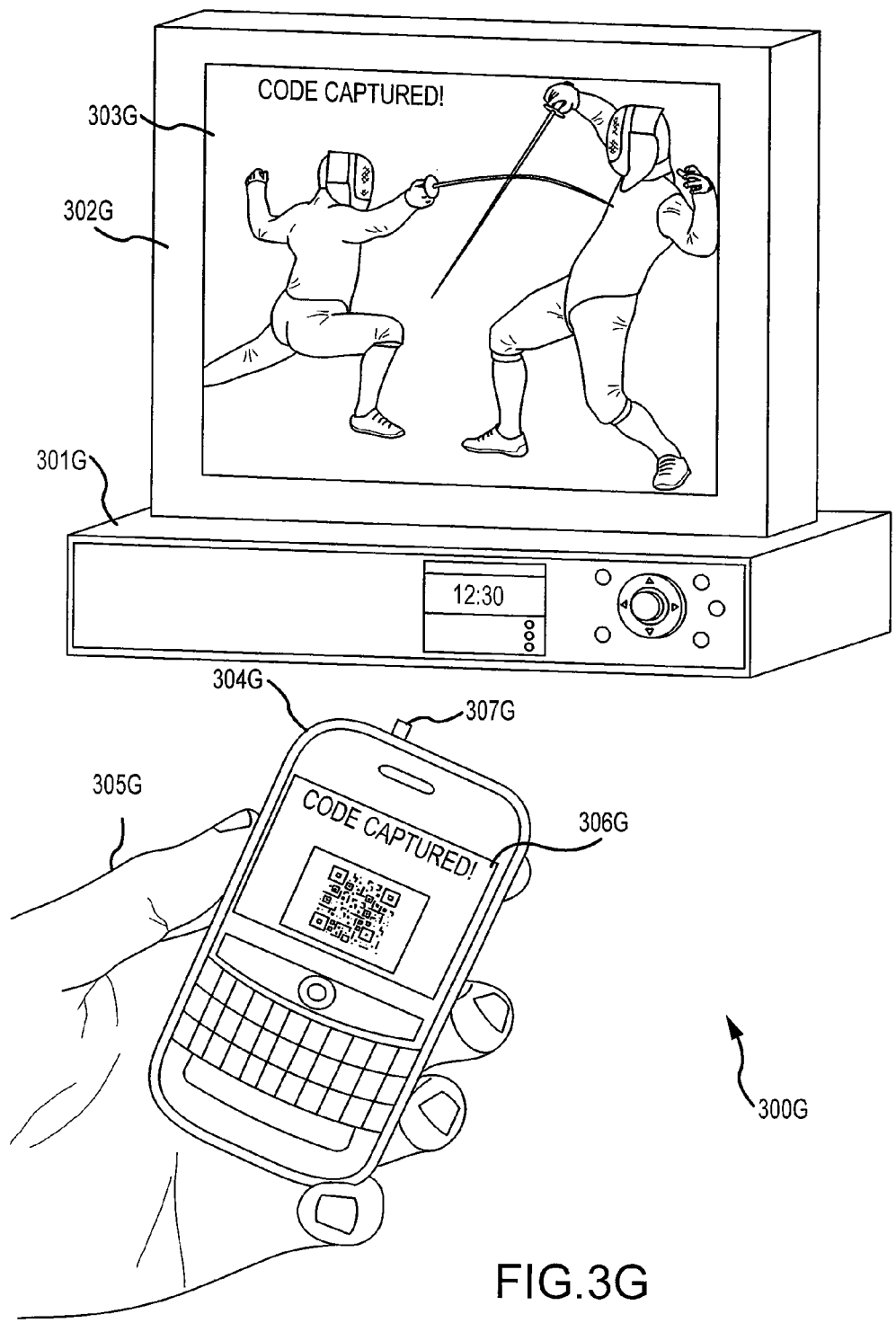

Subsequently, as illustrated in FIG. 3E, the set top box 301E transmits the matrix code to the television 302E, which the television displays on the screen 303E. As illustrated in FIG. 3F, the user 305F may then utilize the smart phone 304F to capture the matrix code. Further, as illustrated in FIG. 3G, the smart phone 304G may transmit a confirmation message to the set top box 301G indicating that the matrix code was successfully captured. In response to receiving the confirmation message, the set top box may transmit a confirmation indication to the television 302G, which the television displays on the screen 303G.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for assisting matrix code capture by signaling matrix code readers, the method comprising:
   identifying, utilizing an electronic device, that the electronic device will transmit at least one matrix code to at least one display device;
   determining to transmit at least one signal from the electronic device to at least one matrix code reader device; and
   transmitting, prior to the transmission of the at least one matrix code to the at least one display device, the at least one signal from the electronic device to the at least one matrix code reader wherein the at least one signal instructs the at least one matrix code reader device to perform at least one action related to capturing the at least one matrix code displayed by the at least one display device.

2. The method of claim 1, wherein the at least one action comprises presenting at least one alert via the at least one matrix code reader device.

3. The method of claim 1, wherein the at least one action comprises launching at least one matrix code capture application of the at least one matrix code reader device.

4. The method of claim 1, wherein the at least one action comprises at least one of preparing at least one camera of the at least one matrix code reader device to capture the at least one matrix code or preparing at least one barcode scanner of the at least one matrix code reader device to scan the at least one matrix code.

5. The method of claim 1, further comprising receiving at least one confirmation from the at least one matrix code reader device indicating that the at least one matrix code reader device captured the at least one matrix code.

6. The method of claim 1, further comprising creating a list of matrix code reader devices wherein said operation of transmitting the at least one signal from the electronic device to the at least one matrix code reader further comprises transmitting the at least one signal to each matrix code reader device on the list of matrix code reader devices.

7. The method of claim 1, wherein said operation of transmitting the at least one signal from the electronic device to the at least one matrix code reader further comprises broadcasting the at least one signal from the electronic device to all matrix code reader devices within a range of the electronic device.

8. The method of claim 1, wherein said operation of identifying, utilizing an electronic device, that the electronic device will transmit at least one matrix code to at least one display device further comprises at least one of:
  determining to generate the at least one matrix code utilizing the at least one electronic device,
  analyzing content that the electronic device is configured to transmit to the display device to detect the at least one matrix code,
  or analyzing metadata included with the content that the electronic device transmits to the at least one display device wherein the metadata indicates that the electronic device will transmit the at least one matrix code to the at least one display device.

9. The method of claim 1, wherein said operation of determining to transmit at least one signal from the electronic device to at least one matrix code reader device further comprises:
  evaluating at least one filter condition list wherein the at least one filter condition list includes at least one condition under which not to transmit the at least one signal from the at least one electronic device to the at least one matrix code reader device;
  determining to transmit the at least one signal from the at least one electronic device to the at least one matrix code reader device when the at least one condition of the at least one filter condition list is not satisfied.

10. The method of claim 9, wherein the at least one condition of the at least one filter condition list includes at least one of a time period, a characteristic of the at least one matrix code, a characteristic of the at least one matrix code reader device, a characteristic of content that the electronic device is configured to transmit to the display device, or a characteristic of metadata included with the content that the electronic device is configured to transmit to the display device.

11. A system for assisting matrix code capture by signaling matrix code readers, comprising:
  at least one matrix code reader device, comprising:
    at least one optical detector element that is configured to capture matrix codes; and
    at least one matrix code reader device processing unit that executes instructions stored in at least one matrix code reader non-transitory storage medium to perform actions; and
  an electronic device, comprising:
    at least one output component that is configured to transmit data to at least one display device;
    at least one communication component that is configured to transmit signals to the at least one matrix code reader device; and
    at least one processing unit that executes instructions stored in at least one non-transitory storage medium to identify that the electronic device will transmit at least one matrix code to the at least one display device via the at least one output component;
    wherein the at least one processing unit determines to transmit at least one signal to the at least one matrix code reader device, prior to the transmission of the at least one matrix code to the at least one display device, via the at least one communication component wherein the at least one matrix code reader device performs at least one action related to capturing the at least one matrix code displayed on the at least one display device in response to receiving the at least one signal.

12. The system of claim 11, wherein the at least one processing unit evaluates at least one filter condition list stored in the at least one non-transitory storage medium, the at least one filter condition list including at least one condition under which not to transmit the at least one signal, and determines to transmit the at least one signal when the at least one condition of the at least one filter condition list is not satisfied.

13. The system of claim 11, wherein the at least one matrix code reader device processing unit evaluates at least one filter condition list stored in the at least one matrix code reader device non-transitory storage medium, the at least one filter condition list includes at least one condition under which not to perform the at least one action related to capturing the at least one matrix code displayed on the at least one display device, and determines to perform the at least one action when the at least one condition of the at least one filter condition list is not satisfied.

14. The system of claim 11, wherein the at least one processing unit identifies that the electronic device will transmit at least one matrix code to the at least one display device by at least one of determining to generate the at least one matrix code analyzing content that the electronic device is configured to transmit to the display device to detect the at least one matrix code, or analyzing metadata included with the content wherein the metadata indicates that the electronic device will transmit the at least one matrix code to the at least one display device.

15. The system of claim 11, wherein the at least one processing unit broadcasts the at least one signal via the at least one communication component to all matrix code reader devices within a communication range of the at least one communication component.

16. The system of claim 11, wherein the at least one processing unit creates a list of matrix code reader devices by pairing matrix code reader devices with the electronic device and the at least one processing unit transmits the at least one signal via the at least one communication component to each matrix code reader device on the list of matrix code reader devices.

17. The system of claim 11, wherein the at least one matrix code reader device processing unit transmits at least one confirmation to the at least one communication component indicating that the at least one matrix code reader device captured the at least one matrix code.

18. The system of claim 11, wherein the at least one processing unit transmits the at least one signal to the at least one matrix code reader device via the at least one communication component a period of time before the at least one processing unit transmits the at least one matrix code to the at least one display device via the at least one output component.

19. The system of claim 11, wherein the at least one action comprises at least one of presenting at least one alert regarding the at least one matrix code, preparing the at least one optical detector element to capture the at least one matrix code, or launching at least one matrix code capture application implemented by the at least one matrix code reader device processing unit.

* * * * *